United States Patent
Yoshida et al.

(10) Patent No.: US 9,242,537 B2
(45) Date of Patent: Jan. 26, 2016

(54) FRAME MOLDING FOR VEHICLE DOOR

(71) Applicant: AISIN SEIKI KABUSHIKI KAISHA, Kariya-shi, Aichi-ken (JP)

(72) Inventors: Koji Yoshida, Anjo (JP); Toshifumi Yanai, Aichi-ken (JP)

(73) Assignee: Aisih Seiki Kabushiki Kaisha, Kariya-shi, Aichi-ken (JP)

( * ) Notice: Subject to any disclaimer, the term of this patent is extended or adjusted under 35 U.S.C. 154(b) by 29 days.

(21) Appl. No.: 14/227,127

(22) Filed: Mar. 27, 2014

(65) Prior Publication Data

US 2014/0292012 A1    Oct. 2, 2014

(30) Foreign Application Priority Data

Mar. 28, 2013   (JP) .................................. 2013-068864

(51) Int. Cl.
| | |
|---|---|
| *B60J 10/00* | (2006.01) |
| *B60J 10/08* | (2006.01) |
| *B60R 13/04* | (2006.01) |
| *B60R 13/02* | (2006.01) |

(52) U.S. Cl.
CPC ............... *B60J 10/085* (2013.01); *B60R 13/04* (2013.01); *B60R 13/02* (2013.01)

(58) Field of Classification Search
CPC ......... B60R 13/02; B60R 13/04; B60J 10/085
USPC .................... 296/1.08, 146.2, 146.5
See application file for complete search history.

(56) References Cited

U.S. PATENT DOCUMENTS

| | | | |
|---|---|---|---|
| 6,679,003 B2* | 1/2004 | Nozaki et al. | 49/441 |
| 2011/0163563 A1* | 7/2011 | Yanai | 296/1.08 |

FOREIGN PATENT DOCUMENTS

| | | |
|---|---|---|
| JP | 2007-137144 | 6/2007 |
| JP | 2010-70106 | 4/2010 |
| JP | 2010-76650 | 4/2010 |
| JP | 2013-132990 | 7/2013 |

* cited by examiner

*Primary Examiner* — Joseph D Pape
*Assistant Examiner* — Dana Ivey
(74) *Attorney, Agent, or Firm* — Finnegan, Henderson, Farabow, Garrett & Dunner, LLP (57) ABSTRACT

A frame molding for a vehicle door configured to provide with a door panel and a door frame and configured to be mounted to a corner portion of a window opening includes a base member including a synthetic resin-made first base portion formed to extend along a first portion of an inner peripheral edge portion of the corner portion of the window opening, the first portion positioned at the door panel, and a synthetic resin-made second base portion formed to extend along a second portion of the inner peripheral edge portion of the corner portion of the window opening, the second portion positioned at the door frame and a decoration sheet being provided at the first base portion and the second base portion to cover respective surfaces of the first base portion and the second base portion, the surfaces facing an outside of a vehicle compartment.

2 Claims, 5 Drawing Sheets

FRAME MOLDING FOR VEHICLE DOOR

CROSS REFERENCE TO RELATED APPLICATIONS

This application is based on and claims priority under 35 U.S.C. §119 to Japanese Patent Application 2013-068864, filed on Mar. 28, 2013, the entire content of which is incorporated herein by reference.

TECHNICAL FIELD

This disclosure generally relates to a frame molding for a vehicle door.

BACKGROUND DISCUSSION

A vehicle door basically includes a door panel that opens and closes an opening portion formed at a vehicle body and a door frame assembled on an upper portion of the door panel. A window opening is formed between the door panel and the door frame. Each JP2007-137144A (hereinafter referred to as Patent reference 1) and JP2010-76650A (hereinafter referred to as Patent reference 2) discloses a frame molding assembled on a corner portion of a window opening, that is, on an intersecting portion between a door panel and a door frame. The frame molding extends from an end portion at the door frame positioned at an upper end portion of the door pane/ towards the door frame and is formed to be curved upwardly along the door frame.

The aforementioned known frame molding is formed by press working of metal plate, for example, stainless steel plate. Therefore, torsions and lines caused by distortion may be formed at a bent portion to be formed in a recessed shape or a protruded shape by press working, which may lead to an inferior appearance. Accordingly, a design shape of the frame molding cannot be complicated. In particular, the frame molding cannot include, for example, a curve portion with a small radius of curvature, a sharp uneven portion, and a deep groove portion. As described above, there are many restrictions in forming the frame molding.

A need thus exists for a frame molding for a vehicle door which is not susceptible to the drawback mentioned above.

SUMMARY

According to an aspect of this disclosure, a frame molding for a vehicle door configured to provide with a door panel configured to open and close an opening portion provided at a vehicle body and a door frame being mounted to an upper end portion of the door panel and configured to be mounted to a corner portion of a window opening, the corner portion formed at an intersecting portion of the door panel and the door frame of the vehicle door in which the window opening is formed between the door panel and the door frame includes a base member including a synthetic resin-made first base portion formed to extend along a first portion of an inner peripheral edge portion of the corner portion of the window opening, the first portion positioned at the door panel, and a synthetic resin-made second base portion formed to extend along a second portion of the inner peripheral edge portion of the corner portion of the window opening, the second portion positioned at the door frame and a decoration sheet being provided at the first base portion and the second base portion to cover respective surfaces of the first base portion and the second base portion, the surfaces facing an outside of a vehicle compartment.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
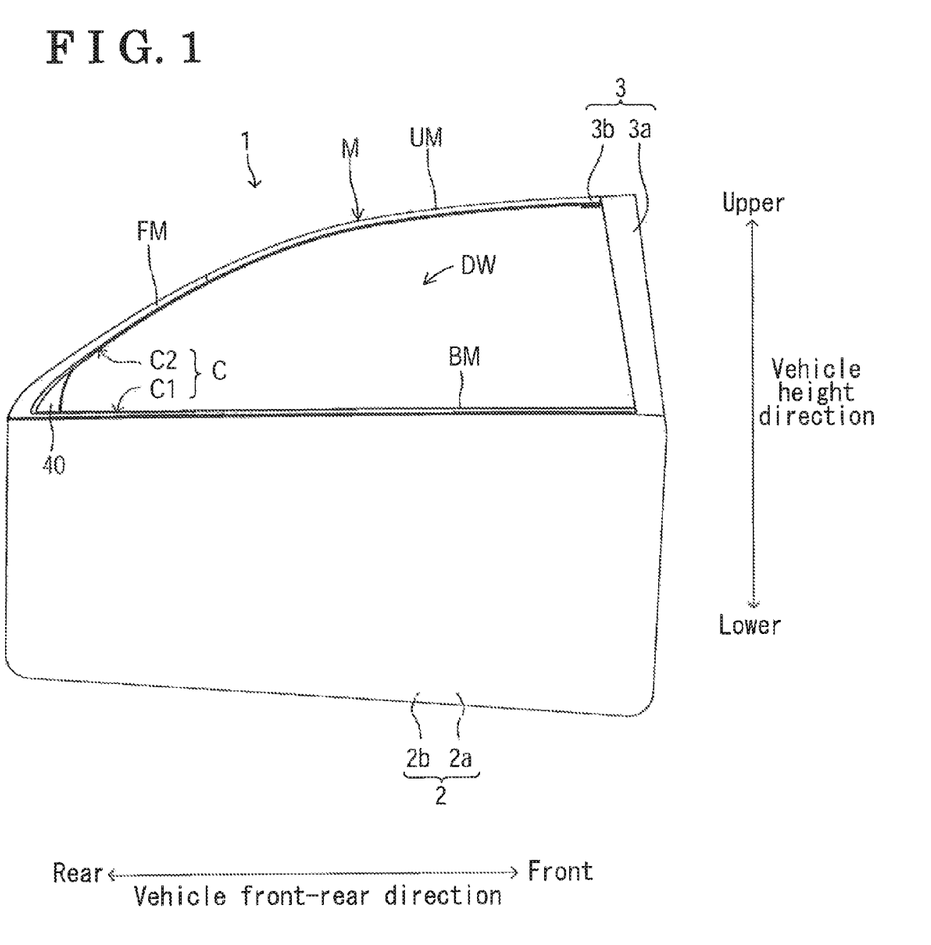
FIG. 1 is a side view of a vehicle door on which a frame molding of an embodiment is mounted.

A frame molding FM for a vehicle door 1 according to an embodiment will be explained with reference to the attached drawings. A configuration of the vehicle door 1 on which the frame molding FM is assembled will be explained. As illustrated in FIG. 1, the vehicle door 1 includes a door panel 2 opening and closing an entrance/exit, or a door opening for an occupant seated in, for example, a right-rear seat of the vehicle and a door frame 3 assembled on the door panel 2. The frame molding FM is not limited to the door for the right-rear seat and is applicable to any doors of the vehicle.

The door panel 2 is assembled on a body portion of the vehicle via a hinge. The door panel 2 includes an outer panel 2a positioned at an outside of a vehicle compartment and an inner panel 2b arranged at an inside of the vehicle compartment. The outer panel 2a and the inner panel 2b are joined to each other to open upward, thereby forming a bag shape. As illustrated in FIG. 1, the door frame 3 is assembled on an upper end portion of the door panel 2. The door frame 3 includes an upright portion 3a extending upward from a front end portion of the door panel 2 and a curve portion 3b obliquely extending upward and frontward from a rear end portion of the door panel 2. A lower end portion of the upright portion 3a is positioned to be inserted in between the outer panel 2a and the inner panel 2b to be welded to the front end portion of the door panel 2, for example, to the front end portion of the inner panel 2b. An upper end portion of the upright portion 3a is connected to a front end portion of the curve portion 3b. A rear end portion of the curve portion 3b is positioned to be inserted in between the outer panel 2a and the inner panel 2b to be welded to the rear end portion of the door panel 2, for example, to the rear end portion of the inner panel 2b.

A window opening DW is formed between the door panel 2 and the door frame 3. A door glass is accommodated within the door panel 2. The door glass is driven to move upward and downward by a lifting apparatus so that the window opening DW is opened and closed. A door window molding M is assembled on the door panel 2 and the door frame 3 to achieve an improved appearance of a peripheral edge portion of the window opening DW. The door window molding M includes an upper molding UM, a belt-line molding BM, and the frame molding FM. The respective configurations of the upper molding UM and the belt-line molding BM are similar to the known configurations.

Figure 2:
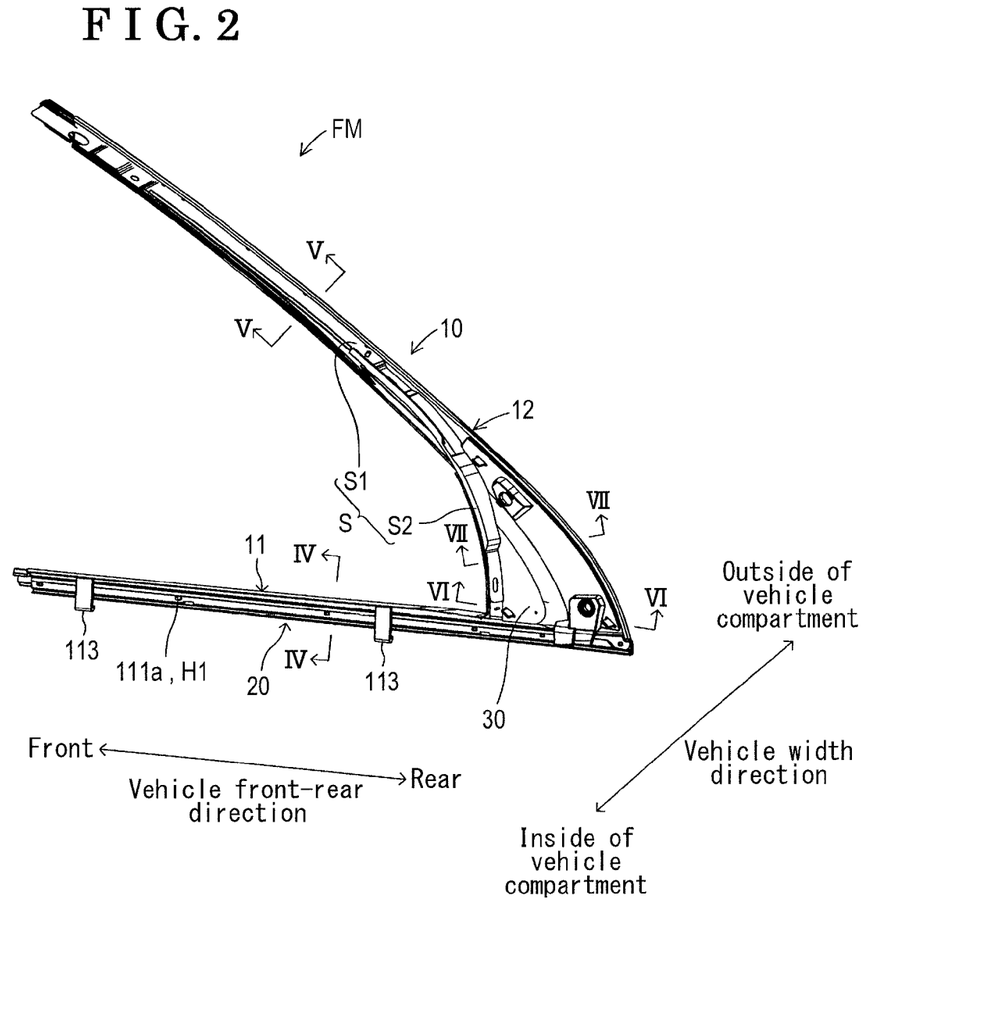
FIG. 2 is a perspective view of the frame molding.
Figure 3:
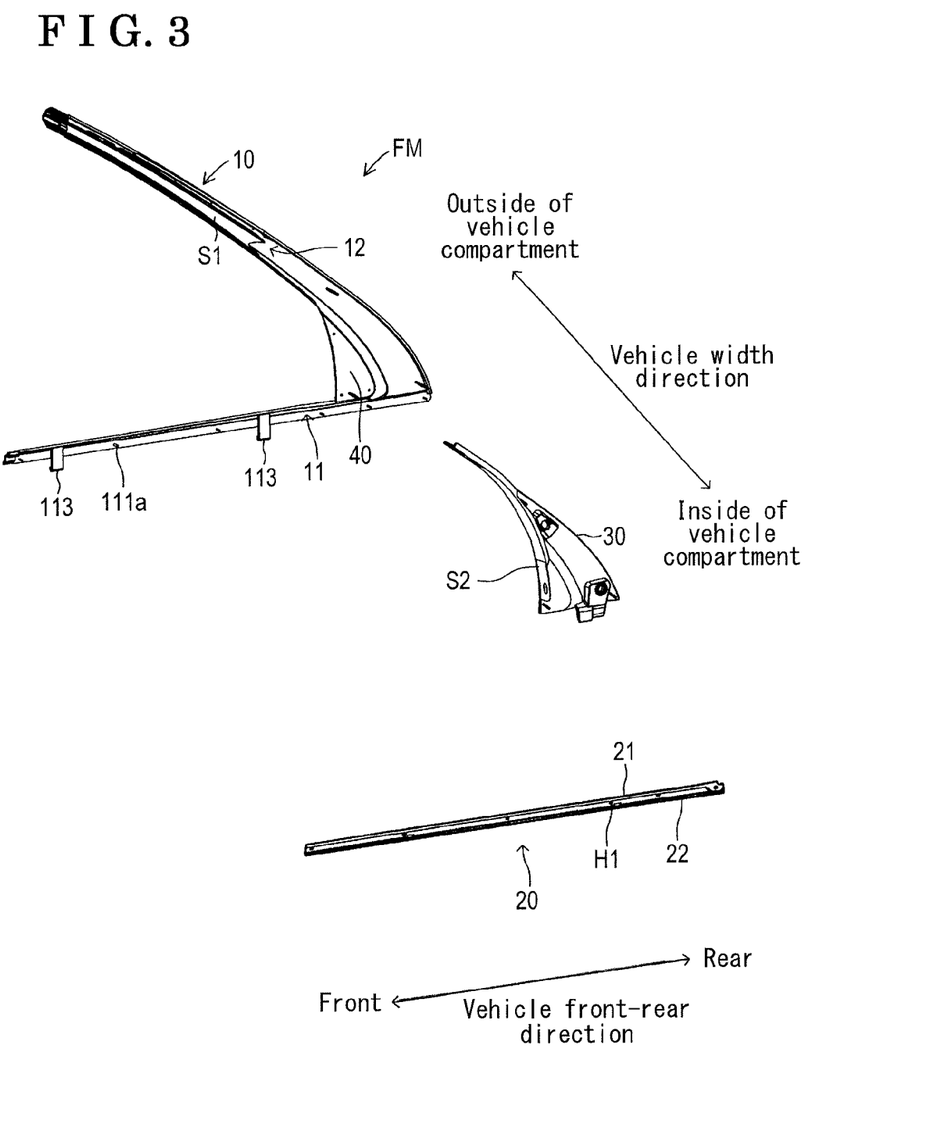
FIG. 3 is an exploded perspective view of the frame molding.

The frame molding FM is assembled on an inner peripheral edge portion of a corner portion C of the window opening DW formed at an intersecting portion between the door panel 2 and the curve portion 3b. As illustrated in FIGS. 2 and 3, the frame molding FM includes a base member 10. In the following explanation, directions and orientations correspond to those of the vehicle in a state where the vehicle door 1 is closed.

The base member 10 includes a first base portion 11 and a second base portion 12. The first base portion 11 is formed to extend rearward of an intermediate portion which is positioned slightly rear of a center portion in a front-rear direction of the upper end portion of the door panel 2. The second base portion 12 is formed to extend upward along the door frame 3 from a rear end of the first base portion 11. Specifically, the first base portion 11 is formed to extend along a first portion C1 of the inner peripheral edge portion of the corner portion C, the first portion C1 positioned at the door panel 2. The second base portion 12 is formed to extend along a second portion C2 of the inner peripheral edge portion of the corner portion C, the second portion C2 positioned at the door frame 3. The first base portion 11 and the second base portion 12 are integrally formed by injection-molding of synthetic resin. The base member 10 is formed to be curved along the corner portion C in a view from the outside and inside of the vehicle compartment.

Figure 4:
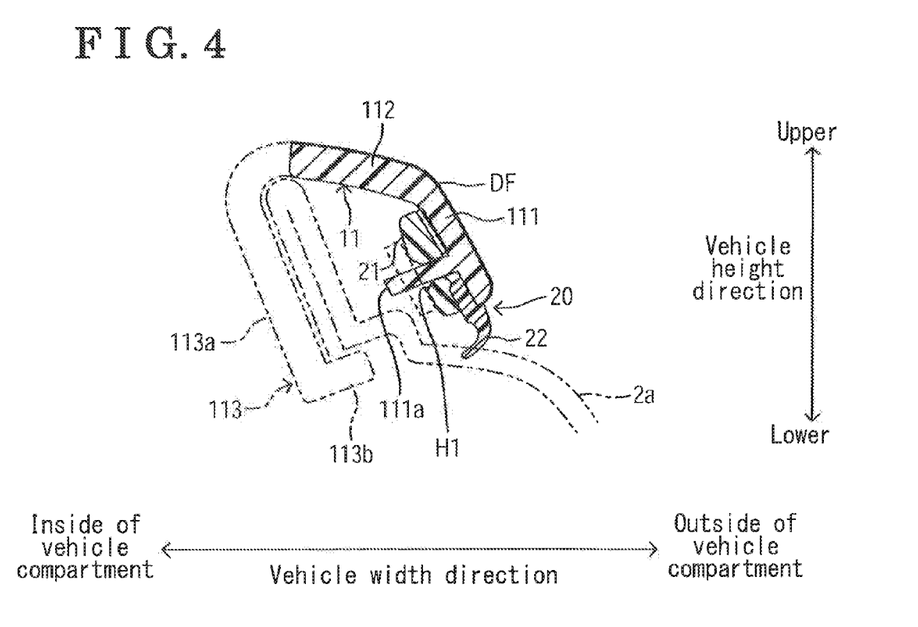
FIG. 4 is a cross-sectional view of the frame molding which is taken along line IV-IV in FIG. 2.
Figure 5:
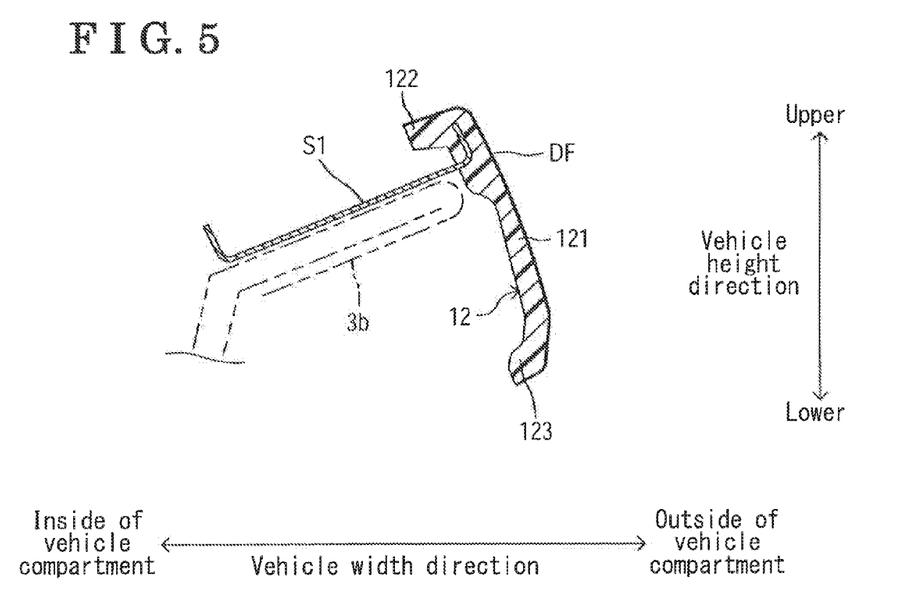
FIG. 5 is a cross-sectional view of the frame molding which is taken along line V-V in FIG. 2.

As illustrated in FIG. 4, the first base portion 11 includes a side board portion 111 and an upper board portion 112. The side board portion 111 is formed in a board shape and extends along the first portion C1 (extends in a vehicle front-rear direction, hereinafter referred to as a front-rear direction) at the door frame 3 of the peripheral edge portion of the corner portion C. The upper board portion 112 is formed to extend towards the inside of the vehicle compartment from an upper end of the side board portion 111. As illustrated in FIG. 5, the second base portion 12 includes a side board portion 121, an upper board portion 122 and a lower board portion 123. The side board portion 121 is formed in the board shape and extends along the second portion C2 at the door frame 3 of the peripheral edge portion of the corner portion C. The upper board portion 122 and the lower board portion 123 are formed to extend towards the inside of the vehicle compartment from the respective upper end and lower ends of the side board portion 121.

A decoration sheet DF is adhered to surfaces of the base member 10, the surfaces facing the outside of the vehicle compartment by a method of vacuum pressure molding. The surfaces facing the outside of the vehicle compartment are, in particular, outer surfaces of the side board portions 111 and 121, upper surfaces of the upper board portions 112 and 122, and a lower surface of the lower board portion 123. The decoration sheet DF is formed by vapor deposition depositing metal particles, for example, indium particles, on a film-shaped base material and accordingly, includes brightness as metal plate.

As illustrated in FIG. 4, a lip member 20 is assembled on an inner side surface of the side board portion 111 of the first base portion 11 facing the inside of the vehicle compartment. The lip member 20 includes a base portion 21 and a lip body portion 22. The base portion 21 is formed to extend in the front-rear direction along the inner side surface of the side board portion 111. The lip body portion 22 is formed to extend along a lower end portion of the base portion 21. The lip body portion 22 is made of synthetic resin softer than the base portion 21. The base portion 21 and the lip body portion 22 are integrally formed by a method of molding two dissimilar materials, or double molding. A lower end of the lip body portion 22 is curved to extend towards the inside of the vehicle compartment. The base portion 21 includes plural through holes H1 penetrating from the outer side surface facing the outside of the vehicle compartment to the inner side surface facing the inside of the vehicle compartment to be spaced from one another in the front-rear direction. The inner side surface of the side board portion 111 includes plural bosses 111a to be spaced from one another in the front-rear direction. Each of the bosses 111a is positioned to be inserted into each of through holes H1 while the outer side surface of the base portion 21 is attached to the inner side surface of the side board portion 111 by means of a double-sided adhesive tape. As illustrated in a dashed line in FIG. 4, an end portion of each of the bosses 111a is thermally caulked to fix the lip member 20 on the first base portion 11. When the lip member 20 is fixed on the first base portion 11 the lower end of the lip body portion 22 is exposed below a lower end of the first base portion 11. That is, the lip body portion 22 is visible from the outside of the vehicle compartment.

The first base portion 11 includes plural engaging portions 113 engaged at the upper end portion of the outer panel 2a. The plural engaging portions 113 are arranged to be spaced from one another in the front-rear direction. The engaging portion 113 includes a leg portion 113B and a protrusion 113b. The leg portion 113a extends from an end portion of the inner side of the upper board portion 112 to downward. The protrusion 113b is formed to protrude from a bottom of the leg portion 113a to the outside of the vehicle compartment.

As illustrated in FIG. 2, the base member 10 includes an engaging member S engaging the second base portion 12 with the curve portion 3b. The engaging member S includes a first engaging member S1 (serving as an upper engaging member) and a second engaging member S2 (serving as a lower engaging member). The first engaging member S1 is formed by a belt-shaped metal plate, for example, stainless steel plate, being bent to be curved to extend from a first end portion (serving as an upper end portion) of opposing end portions in the extending direction of the second base portion 12, the first end portion positioned at an upper end of the window opening DW, to an intermediate portion in the extending direction of the second base portion 12. Specifically, the intermediate portion is slightly closer to a second and portion (serving as a lower end portion) of the opposing end portions in the extending direction of the second base portion 12, the second end portion positioned at the lower end of the window opening DW, than a center portion in the extending direction of the second base portion 12. As illustrated in FIG. 5, opposing end portions in a width direction of the first engaging portion S1, that is, the opposing end portions orthogonal to the extending direction, are bent upward. An outer end portion in the width direction of the first engaging portion S1, that is, the outer end portion positioned at the outside of the vehicle compartment, is positioned to be inserted into the side board portion 121 of the second base portion 12 by insert molding while an inner end portion, that is, the inner end portion positioned at the inside of the vehicle compartment, protrudes from the inner side surface of the side board portion 121 to the inside of the vehicle compartment.

Figure 6:
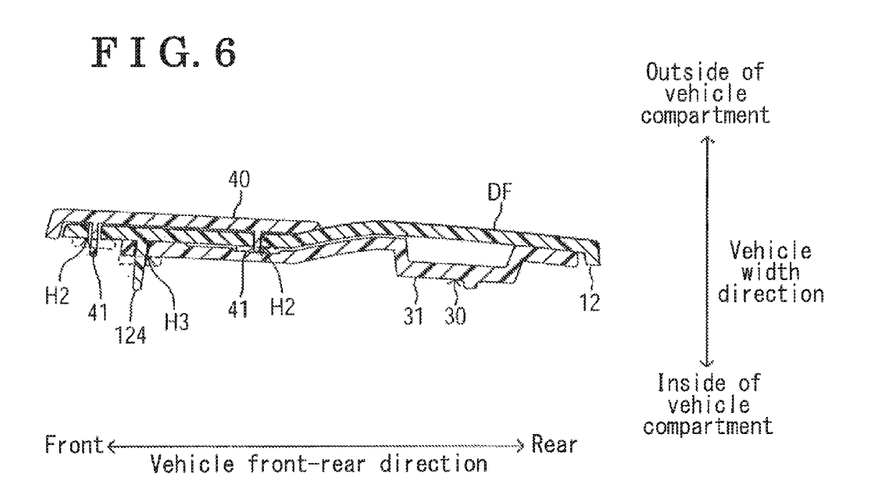
FIG. 6 is a cross-sectional view of the frame molding which is taken along line VI-VI in FIG. 2.
Figure 7:
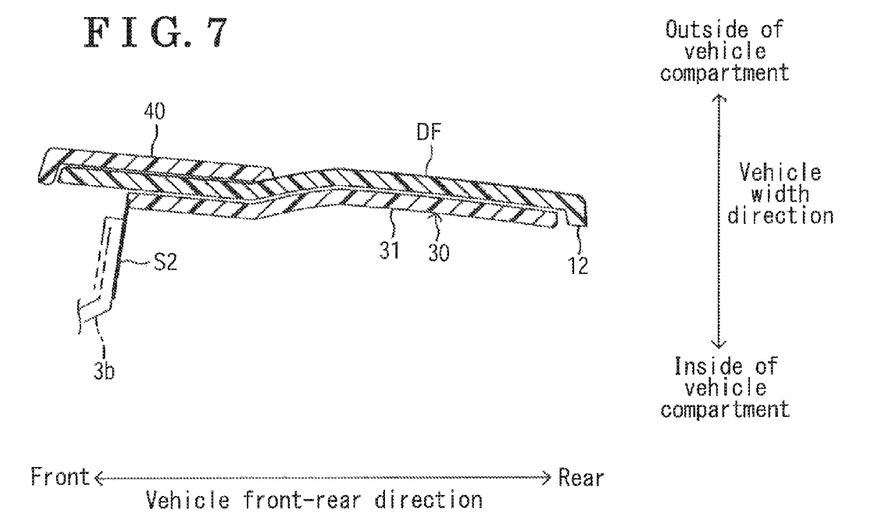
FIG. 7 is a cross-sectional view of the frame molding which is taken along line VII-VII in FIG. 2.

The second engaging member S2 is assembled on the second base portion 12 via a fixing member 30. The fixing member 30 is assembled on the inner side surface of the second end portion of the second base portion 12. The fixing member 30 includes a board-shaped base portion 31 made of synthetic resin harder than the second base portion 12. The shape of the base portion 31 is substantially similar to the shape of the second end portion of the second base portion 12. That is, a rear edge portion of the base portion 31 is curved along an outer peripheral edge of the second base portion 12 while a front edge portion of the base portion 31 is curved to be along an inner peripheral edge of the curve portion 3b of the door frame 3. The second engaging member S2, formed by a belt-shaped metal plate, for example, stainless steel plate, is bent to be curved to extend along the front edge portion of the base portion 31. As illustrated in FIG. 7, a first end portion of opposing end portions in the width direction of the second engaging portion S2, that is, the opposing end portions orthogonal to the extending direction, is positioned at the front edge portion of the base portion 31 by insert molding while a second end portion of the opposing end portions in the width direction of the second engaging portion S2 protrudes from the inner side surface of the base portion 31 toward the inside of the vehicle compartment. As illustrated in FIG. 6, the base portion 31 includes a through hole H3 penetrating from the outer side surface facing the outside of the vehicle compartment to the inner side surface facing the inside of the vehicle compartment. A boss 124 is positioned at the inner side surface of the second end portion of the second base portion 12. The boss 124 penetrates the through hole H3, and, as illustrated in a dashed line in FIG. 6, an end portion of the boss 124 is thermally caulked to fix the fixing member 30 on the second end portion of the second base portion 12. The upper end portion of the second engaging member S2, that is, the end portion of the opposite end portions in the extending direction of the second engaging member S2, the end portion positioned at the upper end portion of the wind opening DW, is fixed to a lower end portion of the first engaging member S1, that is, the end portion of the opposite end portions in the extending direction of the first engaging member 81, the end portion positioned at a lower end portion of the wind opening DW, using a screw or a rivet.

Further, the base member 10 includes a decoration member 40 for enhancing the appearance of the inner peripheral edge portion where the first base portion 11 and the second base portion 12 are intersected. The decoration member 40 is assembled on the outer side surface of the second end portion of the second base portion 12. The decoration member 40, made of synthetic resin, is formed in the board shape. As illustrated in FIGS. 1 to 3, the decoration member 40 is trimmed in a triangle shape in a view from the outside of the vehicle compartment. As illustrated in FIG. 6, the inner side surface of the decoration member 40 includes a boss 41. A through hole H2 is formed so as to penetrate from the outer side surface facing the outside of the vehicle compartment to the inner side surface facing the inside of the vehicle compartment. The boss 41 penetrates the through hole H2, and, as illustrated in the dashed line in FIG. 6, an end portion of the boss 41 is thermally caulked to fix the decoration member 40 on the base member 10.

Next, procedures for assembling the door window molding M on the inner peripheral edge portion of the window opening DW will be explained. A front end portion of the upper molding UM is connected to the first end portion of the second base portion 12 via a connection member. Next, the frame molding FM and the upper molding UM are assembled on the outer panel 2a in a way as explained below. As illustrated in FIG. 4, the first base portion 11 is held close to an upper end portion of the outer panel 2a from upper of the upper end portion of the outer panel 2a so as to insert an upper end portion of the outer panel 2a between the engaging portion 113 and the side board portion 111. A step portion is formed at an inner side surface of the outer panel 2a to engage with a protrusion 113b of the engaging portion 113. Accordingly, the first base portion 11 is fixed on the outer panel 2a.

Then, each of the first and second engaging members S1 and S2 is fixed on the curve portion 3b using, for example, a screw or rivet. The inner side surface of the upper molding UM includes an engaging portion engaging with the curve portion 3b. The engaging portion is fixed on the curve portion 3b using, for example, a screw or rivet. As described above, the frame molding FM and the upper molding UM are assembled on the outer panel 2a and the curve portion 3b. As illustrated in FIG. 4, when the frame molding FM and the upper molding UM are assembled on the outer panel 2a and the curve portion 3b, a lower end portion of the lip body portion 22 is in contact with the outer side surface of the outer panel 2a. Accordingly, this construction prevents a clearance from being formed between the lower edge portion of the frame molding FM and the outer panel 2a.

Next, the belt-line molding BM is assembled on the upper end portion of the outer panel 2a. Procedures for assembling the belt-line molding BM on the outer panel 2a are the same as known procedures. That is, the belt-line molding BM is positioned on the upper end portion of the outer panel 2a and slides rearward so that the rear end portion of the belt-line molding BM is connected to the front end portion of the first base portion 11 via a connection member. A front end portion of the belt-line molding BM is fixed to the outer panel 2a using, for example, a clip. As such, the door window molding M is mounted to the inner peripheral edge portion of the window opening DW.

For example, in the aforementioned embodiment, the boss 124 formed at the second base portion 12 is thermally caulked to fix the fixing member 30 on the second base portion 12. Alternatively, the fixing member 30 and the second base portion 12 are fixed by, for example, hot plate welding or ultra sonic welding. According to the aforementioned embodiment, the first engaging portion S1 is formed to extend from the first end portion in the extending direction of the second base portion 12 to a portion slightly close to the second end portion in the extending direction of the second base portion 12. Alternatively, the first engaging portion S1 may be formed to extend from the first end portion in the extending direction of the second base portion 12 to the intermediate portion in the extending direction of the second base portion 12. Further, the first engaging portion S1 may be formed to extend from the first end portion in the extending direction of the second base portion 12 to a portion slightly close to the first end portion in the extending direction of the second base portion 12. According to the aforementioned embodiment, the engaging member S is provided with the first engaging member S1 and the second engaging member S2. Alternatively, in a case where the dimensional precision and the positional accuracy of the engaging member S can be slightly deteriorated compared to the aforementioned embodiment, the engaging member S may be integrally formed. In this case, the engaging member S may be assembled on the second base portion 12 without including the fixing member 30. Alternatively, the base portion 31 of the fixing member 30 may be formed to extend from the first end portion to the second end portion in the extending direction of the second base portion 12. Then, the engaging member S may be assembled on the base portion 31 which is assembled on the second base portion 12.

According to the aforementioned embodiment, the frame molding FM for the vehicle door 1 configured to provide with the door panel 2 configured to open and close the opening portion provided at the vehicle body and the door frame 3 being mounted to the upper end portion of the door panel 2 and configured to be mounted to the corner portion C of the window opening DW, the corner portion C formed at the intersecting portion of the door panel 2 and the door frame 3 of the vehicle door 1 in which the window opening DW is formed between the door panel 2 and the door frame 3 includes the base member 10 including the synthetic resin-made first base portion 11 formed to extend along the first portion C1 of the inner peripheral edge portion of the corner portion C of the window opening DW, the first portion C1 positioned at the door panel 2, and the synthetic resin-made second base port on 12 formed to extend along the second portion C2 of the inner peripheral edge portion of the corner portion C of the window opening DW, the second portion C2 positioned at the door frame 3 and the decoration sheet DF being provided at the first base portion 11 and the second base portion 12 to cover the respective surfaces of the first base portion 11 and the second base portion 12, the surfaces facing the outside of the vehicle compartment.

According to the aforementioned configuration, the surfaces of synthetic resin-made first base portion 11 and the second base portion 12 facing the outside of the vehicle compartment are covered with the decoration sheet DF. By applying the decoration sheet DF including the metal brightness, the decoration sheet DF can simulate the frame molding formed by press working of metal plate. Therefore, the torsions and the lines caused by distortion caused in the known frame molding are not formed, achieving the improved the appearance. Further, the restriction relating to the design shape is reduced. That is, the frame molding can include, for example, the curve portion with small radius of curvature, the sharp uneven portion, and the deep groove portion. By changing the type of the decoration sheet DF, the color and texture of the frame molding FM are changed easily. According to the aforementioned embodiment, the frame molding FM improves the quality of appearance. Further, the frame molding FM of the embodiment may be lighter in weight than the known frame molding.

According to the aforementioned embodiment, the frame molding FM for the vehicle door 1 further includes the engaging member S, S1, S2 (engaging member S, first engaging member S1, second engaging member S2) being made of metal, being formed to extend along the extending direction of the second base portion 12 and being configured to engage the second base portion 12 with the door frame 3. The engaging member S, S1, S2 (engaging member S, first engaging member S1, second engaging member S2) is integrally formed with the second base portion 12.

According to the aforementioned construction, the second base portion 12 and the engaging member S, S1, S2 (engaging member S, first engaging member S1, second engaging member S2) are integrally formed by, for example, insert molding. Therefore, the second base portion may be mounted on the door frame 3 with a simple configuration.

According to the aforementioned embodiment, the frame molding FM for the vehicle door 1 further includes the fixing member 30 being made of synthetic resin harder than a material of the second base portion 12 and being mounted to the lower end portion of opposing end portions in the extending direction of the second engaging member S2, the lower end portion configured to be positioned at the lower end of the window opening DW. The frame molding FM for the vehicle door 1 is integrally formed with the fixing member 30 at the lower end portion of the opposing end portions in the extending direction of the second base portion 12, the end portion configured to be positioned at the lower end of the window opening DW.

According to the aforementioned construction, the lower end portion positioned at the lower end of the window opening DW of the opposing end portions in the extending direction of the second engaging member S2 is mounted to the lower end portion of the opposing end portions in the extending direction of the second base portion 12, the lower end portion positioned at the lower end of the window opening DW, via the fixing member 30 which is made of synthetic resin harder than the second base portion 12. That is, while not being directly supported by the door frame 3, the lower end portion of the second base portion 12 is strengthened by the fixing member 30. Thus, the lower end portion of the second base portion 12 may be prevented from swinging, or vibrating when the vehicle is moving.

According to the aforementioned embodiment, the fixing member 30 is thermally caulked to be fixed on the second base portion 12.

According to the aforementioned construction, the material cost and process may be reduced compared to a case where the fixing member 30 and the second base portion 12 are fixed by means of, for example, glue or double-sided adhesive tape.

According to the aforementioned embodiment, the engaging member S includes the upper engaging member S1 (first engaging member S1) being formed to extend from the upper end portion of opposing end portions in the extending direction of the second base portion 12, the upper end portion configured to be positioned at the upper end of the window opening DW, to the intermediate portion in the extending direction of the second base portion 12 and integrally formed with the second base portion 12 and the second engaging member S2 being formed to extend from the lower end portion of the opposing end portions in the extending direction of the second base portion 12, the lower end portion configured to be positioned at the lower end of the window opening DW, to the intermediate portion in the extending direction of the second base portion 12 and integrally formed with the fixing member 30.

According to the aforementioned construction, the engaging member S is configured with the first engaging member S1 and the second engaging member S2. That is, each of the first engaging member S1 and the second engaging member S2 is shorter than an engaging member in which the first engaging member S1 and the second engaging member S2 are integrally formed to extend from the upper end portion to the lower end portion in the extending direction of the second base portion 12. Thus, the dimensional precision in the extending direction of the first engaging member S1 and the second engaging member S2 is high while the positional accuracy of the first engaging member S1 and the second engaging member S2 to the side board portion 121 and the base portion 31 is high, respectively.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A frame molding for a vehicle door configured to provide with a door panel configured to open and close an opening portion provided at a vehicle body and a door frame being mounted to an upper end portion of the door panel and configured to be mounted to a corner portion of a window opening, the corner portion formed at an intersecting portion of the door panel and the door frame of the vehicle door wherein the window opening is formed between the door panel and the door frame, comprising:

a base member including a synthetic resin-made first base portion formed to extend along a first portion of an inner peripheral edge portion of the corner portion of the window opening, the first portion of the inner peripheral edge portion being positioned at the door panel, and a second base portion formed to extend along a second portion of the inner peripheral edge portion of the corner portion of the window opening, the second portion of the inner peripheral edge portion being positioned at the door frame, wherein the first base portion and the second base portion include respective surfaces facing an outside of a vehicle compartment, and wherein the second base portion is made of a second-base-portion synthetic resin;

a decoration sheet being provided at the first base portion and the second base portion to cover the respective surfaces of the first base portion and the second base portion;

an engaging member being made of metal, being formed to extend along an extending direction of the second base portion and being configured to engage the second base portion with the door frame, wherein the engaging member is integrally formed with the second base portion; and a fixing member being made of synthetic resin having a hardness greater than that of the second-base-portion synthetic resin and being mounted to a lower end portion of opposing end portions in the extending direction of the engaging member, the lower end portion configured to be positioned at a lower end of the window opening, wherein the frame molding for the vehicle door is integrally formed with the fixing member at a lower end portion of opposing end portions in the extending direction of the second base portion, the lower end portion configured to be positioned at the lower end of the window opening.

2. The frame molding for the vehicle door according to claim 1, wherein the fixing member is thermally caulked to be fixed on the second base portion.

* * * * *